US 9,479,764 B2

(12) United States Patent
Meuninck et al.

(10) Patent No.: US 9,479,764 B2
(45) Date of Patent: *Oct. 25, 2016

(54) METHOD AND APPARATUS FOR PRESENTING MEDIA CONTENT

(71) Applicant: AT&T Intellectual Property I, LP, Atlanta, GA (US)

(72) Inventors: Troy Meuninck, Newman, GA (US); William A. Brown, Woodstock, GA (US); Nadia Morris, Decatur, GA (US); James Carlton Bedingfield, Sr., Lilburn, GA (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 820 days.

This patent is subject to a terminal disclaimer.

(21) Appl. No.: 13/746,637

(22) Filed: Jan. 22, 2013

(65) Prior Publication Data
US 2013/0128018 A1    May 23, 2013

Related U.S. Application Data

(63) Continuation of application No. 12/816,585, filed on Jun. 16, 2010, now Pat. No. 8,402,502.

(51) Int. Cl.
*H04N 7/16* (2011.01)
*H04N 13/04* (2006.01)

(52) U.S. Cl.
CPC ...... *H04N 13/0436* (2013.01); *H04N 13/0438* (2013.01)

(58) Field of Classification Search
CPC .............. H04N 7/17318; H04N 21/4126; H04N 5/44543; H04N 13/0497; H04N 13/0404; H04N 13/0409

USPC ................ 725/43, 133, 141, 153; 348/51–59
See application file for complete search history.

(56) References Cited

U.S. PATENT DOCUMENTS

| | | |
|---|---|---|
| 2,832,821 A | 4/1958 | Du Mont |
| 4,649,425 A | 3/1987 | Pund |
| 5,465,175 A | 11/1995 | Woodgate |
| 6,014,164 A | 1/2000 | Woodgate |
| 6,188,442 B1 | 2/2001 | Narayanaswami |
| 6,285,368 B1 | 9/2001 | Sudo |

(Continued)

FOREIGN PATENT DOCUMENTS

JP    2011019917 A    2/2011

OTHER PUBLICATIONS

PCT Search Report, PCT/US2011/035121, Jul. 26, 2011.

(Continued)

*Primary Examiner* — Jason Salce
(74) *Attorney, Agent, or Firm* — Guntin & Gust, PLC; Atanu Das

(57) ABSTRACT

A system that incorporates teachings of the present disclosure may include, for example, presenting a plurality of unassociated media programs from a single presentation device having overlapping presentation periods, receiving information from a viewing apparatus to adjust an intensity of emitted light associated with one of the unassociated media programs, and adjusting the intensity of the emitted light in a manner that is detectable by the viewing apparatus supplying the information. Other embodiments are disclosed and contemplated.

20 Claims, 11 Drawing Sheets

(56) References Cited

U.S. PATENT DOCUMENTS

| | | |
|---|---|---|
| 6,535,241 B1 | 3/2003 | McDowall |
| 6,654,721 B2 | 11/2003 | Handelman |
| 7,204,592 B2 | 4/2007 | O'Donnell |
| 8,269,822 B2 | 9/2012 | Zalewski et al. |
| 2002/0122145 A1 | 9/2002 | Tung |
| 2004/0218104 A1 | 11/2004 | Smith |
| 2005/0270367 A1 | 12/2005 | McDowall |
| 2006/0109200 A1 | 5/2006 | Alden |
| 2007/0242068 A1 | 10/2007 | Han |
| 2007/0263003 A1 | 11/2007 | Ko |
| 2007/0266412 A1 | 11/2007 | Trowbridge |
| 2008/0062125 A1 | 3/2008 | Kitaura |
| 2009/0100474 A1 | 4/2009 | Migos |
| 2009/0315977 A1 | 12/2009 | Jung |
| 2010/0007582 A1 | 1/2010 | Zalewski |
| 2010/0066816 A1 | 3/2010 | Kane |
| 2010/0134411 A1 | 6/2010 | Tsumura |
| 2010/0177172 A1 | 7/2010 | Ko |
| 2010/0188488 A1 | 7/2010 | Birnbaum et al. |
| 2010/0192181 A1 | 7/2010 | Friedman |
| 2010/0225576 A1 | 9/2010 | Morad |
| 2011/0012896 A1 | 1/2011 | Ji |
| 2011/0078737 A1 | 3/2011 | Kanemaru |
| 2011/0221874 A1 | 9/2011 | Oh |
| 2011/0225611 A1 | 9/2011 | Shintani |
| 2011/0271304 A1 | 11/2011 | Loretan |
| 2012/0026396 A1 | 2/2012 | Banavara |
| 2012/0033048 A1 | 2/2012 | Ogawa |
| 2012/0050507 A1 | 3/2012 | Keys |

OTHER PUBLICATIONS

Edwards, "Active Shutter 3D Technology for HDTV", PhysOrg.com; 12 pages; Sep. 25, 2009; http://www.physorg.com/news173082582.html; web site last visited May 10, 2010.

200

500

600

Polarized Display

700

900

METHOD AND APPARATUS FOR PRESENTING MEDIA CONTENT

CROSS-REFERENCE TO RELATED APPLICATIONS

This application is a continuation of U.S. patent application Ser. No. 12/816,585 filed Jun. 16, 2010 which is incorporated herein by reference in its entirety.

FIELD OF THE DISCLOSURE

The present disclosure relates generally to techniques for presenting media content and more specifically to a method and apparatus for presenting media content.

BACKGROUND

Media consumption has become a multibillion dollar industry that continues to grow rapidly. Beginning with the advent of compact audio and video formats such as MPEG-3 and MPEG-4, these technologies have made it easy for users to port music and video into portable devices such as cellular phones, and media players in very small form factors. Because of the small file size produced by these media formats, Flash memory has in large part replaced compact hard drives previously used by these portable devices, thereby improving their durability, and battery life.

High resolution displays such as high definition television (or HDTV) and high resolution computer monitors can now present two-dimensional (2D) movies and games with three-dimensional (3D) perspective with clarity never seen before. Consequently, home viewing of high resolution movies has become very popular. Additionally, high resolution displays have helped to increase the popularity of gaming consoles among teenagers and adults. With high speed Internet access gaming console manufacturers are now able to support multiuser games over broadband connections without trading off video resolution.

Movie producers are beginning to focus their efforts on producing 3D movies that require 3D viewing glasses. Some blockbuster 3D movies such as Avatar™ have motivated manufacturers to produce television sets that support 3D viewing with polarized glasses.

Collectively, improvements in viewing, audio, and communication technologies are causing rapid demand for consumption of all types of media content.

DETAILED DESCRIPTION

Figure 1:
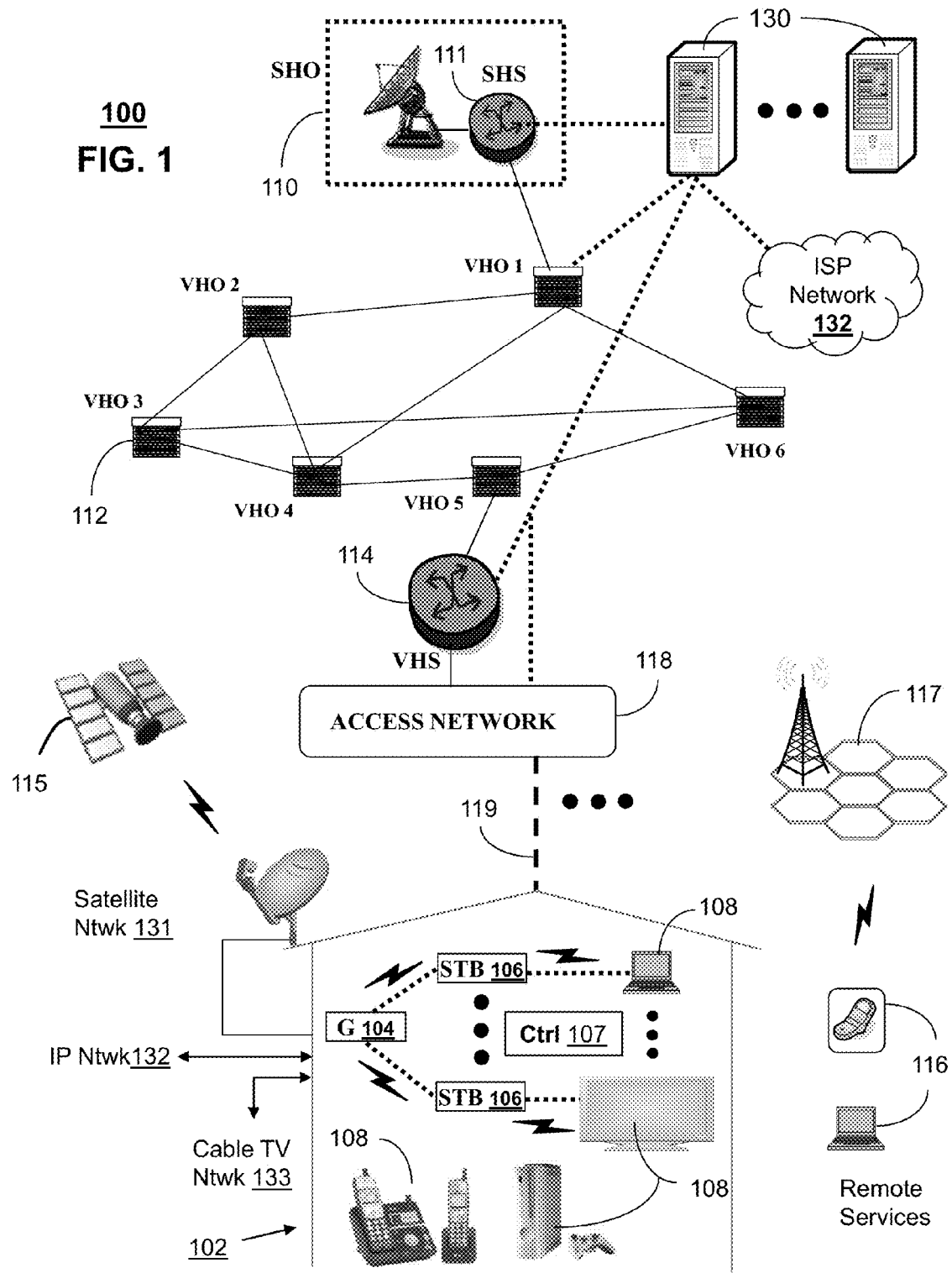
FIGS. 1-2 depict illustrative embodiments of communication systems that provide media services.

One embodiment of the present disclosure can entail a media processor having a controller to assign a first viewing apparatus to a first of one or more periodic time slots, assign a second viewing apparatus to a second of one or more periodic time slots, direct a presentation device to emit light signals associated with a first image during the first of the one or more periodic time slots, direct the presentation device to emit light signals associated with a second image during the second of the one or more periodic time slots, wherein the first viewing apparatus comprises at least one optical element, and wherein the at least one optical element of the first viewing apparatus is enabled to allow the light signals associated with the first image to penetrate the at least one optical element during the first of the one or more periodic time slots, but not during the second of the one or more periodic time slots, and wherein the second viewing apparatus comprises at least one optical element, and wherein the at least one optical element of the second viewing apparatus is enabled to allow the light signals associated with the second image to penetrate the at least one optical element during the second of the one or more periodic time slots, but not the first of the one or more periodic time slots; receive illumination information from the first viewing apparatus, and direct the presentation device to adjust a first intensity of the light signals emitted to the first viewing apparatus during the first of the one or more periodic time slots without affecting a second intensity of the light signals emitted to the second viewing apparatus during the second of the one or more periodic time slots.

One embodiment of the present disclosure can entail a computer-readable storage medium having computer instructions to assign a first viewing apparatus to a first of one or more periodic time slots, assign a second viewing apparatus to a second of one or more periodic time slots, present by way of a presentation device a first image during the first of the one or more periodic time slots, present by way of the presentation device a second image during the second of the one or more periodic time slots, receive illumination information from the first viewing apparatus, and direct the presentation device to adjust a first intensity of the light signals emitted to the first viewing apparatus during the first of the one or more periodic time slots without affecting a second intensity of the light signals emitted to the second viewing apparatus during the second of the one or more periodic time slots. The storage medium can also include computer instructions to transmit to the first viewing apparatus a first audio signal associated with the first image, and transmit to the second viewing apparatus a second audio signal associated with the second image.

One embodiment of the present disclosure can entail a viewing apparatus having a controller to receive a synchronization signal for synchronizing operations of one or more active shutter optical elements of the viewing apparatus with one or more assigned periodic time slots, enable the one or more active shutter optical elements according to the synchronization signal to enable viewing of a select one of a plurality of media programs presented by a media presentation device during the assigned one or more periodic time slots, generate illumination information that indicates a measure of light intensity, and transmit to the media presentation device the illumination information to adjust an intensity of emitted light signals associated with a presentation of the selected one of the plurality of video programs.

One embodiment of the present disclosure can entail a method for presenting a plurality of unassociated media programs from a single presentation device having overlapping presentation periods, wherein each of the plurality of unassociated media programs is viewable only with a viewing apparatus, and wherein the viewing apparatus is configured for viewing one of the unassociated media programs at a time, receiving information from the viewing apparatus to adjust an intensity of emitted light associated with one of the unassociated media programs, and adjusting the intensity of the emitted light in a manner that is detectable by the viewing apparatus supplying the information.

The method can further include presenting the plurality of unassociated media programs according to a modulation scheme, or presenting each of the plurality of unassociated media programs according to one of a time division scheme, or a space division scheme. Each of the plurality of unassociated media programs can represent one of a still image, a moving image, a two-dimensional image, or a three-dimensional image. At least a portion of the method can be operable in a network element of a media communication system.

One embodiment of the present disclosure can entail a presentation device having an autostereoscopic display, and a controller operable to direct the autostereoscopic display to present a plurality of unassociated media programs in overlapping presentation periods, wherein viewability of the plurality of unassociated media programs is location dependent, and adjust an intensity of light of at least one of the plurality of unassociated media programs without substantially affecting the an intensity of light emitted by one or more unaffected media programs. The plurality of unassociated media programs can represent one of a still image, a moving image, a two-dimensional image, or a three-dimensional image. The controller can be further operable to adjust the intensity of light of the at least one of the plurality of unassociated media programs responsive to receiving at least one request from at least one remote controller.

FIG. 1 depicts an illustrative embodiment of a first communication system 100 for delivering media content. The communication system 100 can represent an Internet Protocol Television (IPTV) broadcast media system although other media broadcast systems are contemplated by the present disclosures. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers, television sets, gaming consoles (e.g., PS3, Xbox or Wii) managed in some instances by a media controller 107 (such as an infrared or RF remote control, gaming controller, etc.).

The gateway 104, the media processors 106, and media devices 108 can utilize tethered interface technologies (such as coaxial, phone line, or power line wiring) or can operate over a common wireless access protocol such as Wireless Fidelity (WiFi). With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 (e.g., cellular phone, laptop computer, etc.) by way of a wireless access base station 117 operating according to common wireless access protocols such as WiFi, or cellular communication technologies (such as GSM, CDMA, UMTS, WiMAX, Software Defined Radio or SDR, LTE, and so on).

A satellite broadcast television system can be used in place of the IPTV media system. In this embodiment, signals transmitted by a satellite 115 carrying media content can be intercepted by a common satellite dish receiver 131 coupled to the building 102. Modulated signals intercepted by the satellite dish receiver 131 can be transferred to the media processors 106 for decoding and distributing broadcast channels to the media devices 108. The media processors 106 can be equipped with a broadband port to the IP network 132 to enable services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It is contemplated that the present disclosure can apply to any present or next generation over-the-air and/or landline media content services system.

Figure 2:
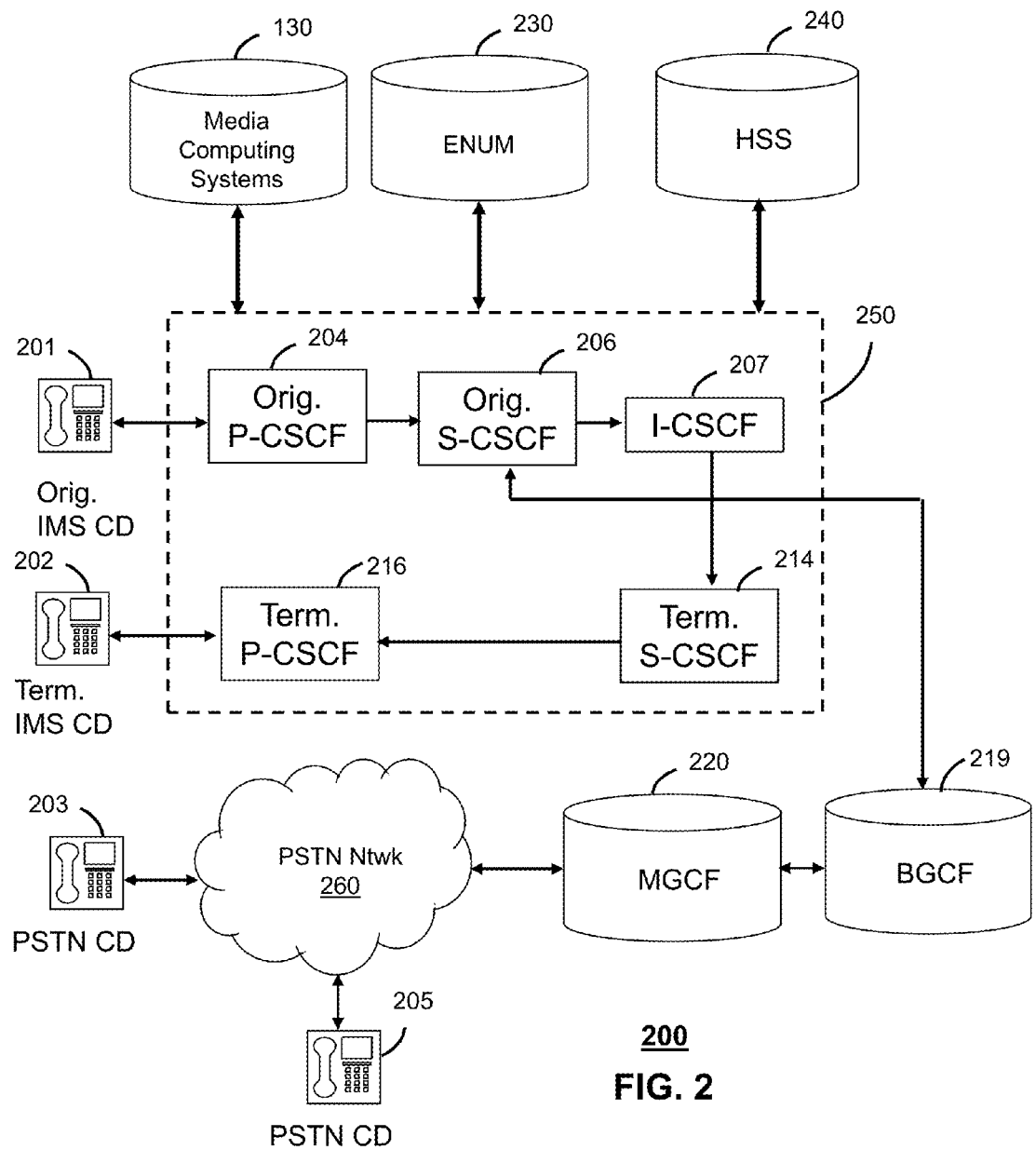

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260. The MGCF 220 is generally not used when a communication session involves IMS CD to IMS CD communications. Any communication session involving at least one PSTN CD can require the use of the MGCF 220.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing. In addition, communication system 200 can be adapted to provide the IMS CDs 201, 203 the multimedia and Internet services of communication system 100.

The first communication system 100 can be operatively coupled to the second communication system 200 by way of computing systems 130 (or other common communication means) to interchangeably share services between said systems.

Figure 3:
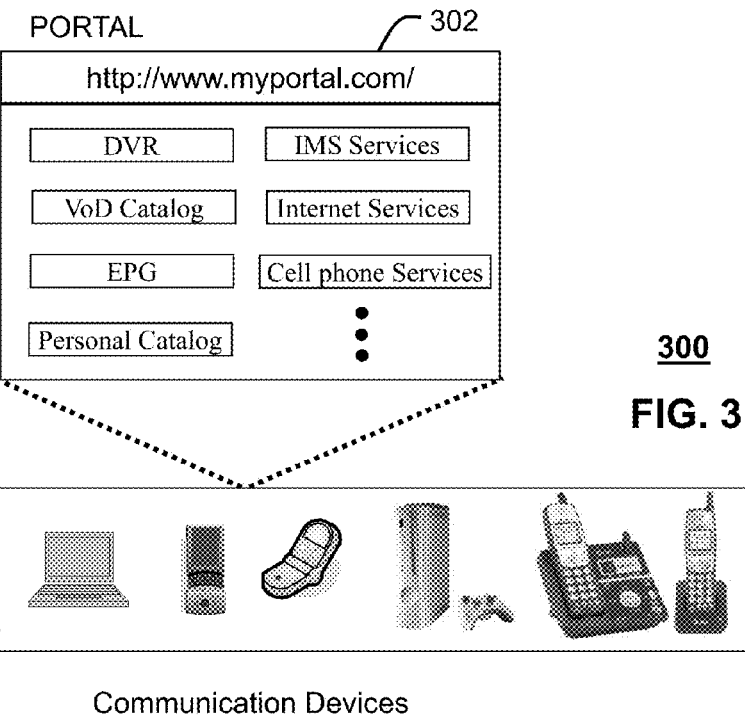
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser using an Internet-capable communication device such as those illustrated FIGS. 1-2. The portal 302 can be configured, for example, to access a media processor 106 and services managed thereby such as a Digital Video Recorder (DVR), a VoD catalog, an EPG, video gaming profile, a personal catalog (such as personal videos, pictures, audio recordings, etc.) stored in the media processor, provisioning IMS services described earlier, provisioning Internet services, provisioning cellular phone services, and so on.

Figure 4:
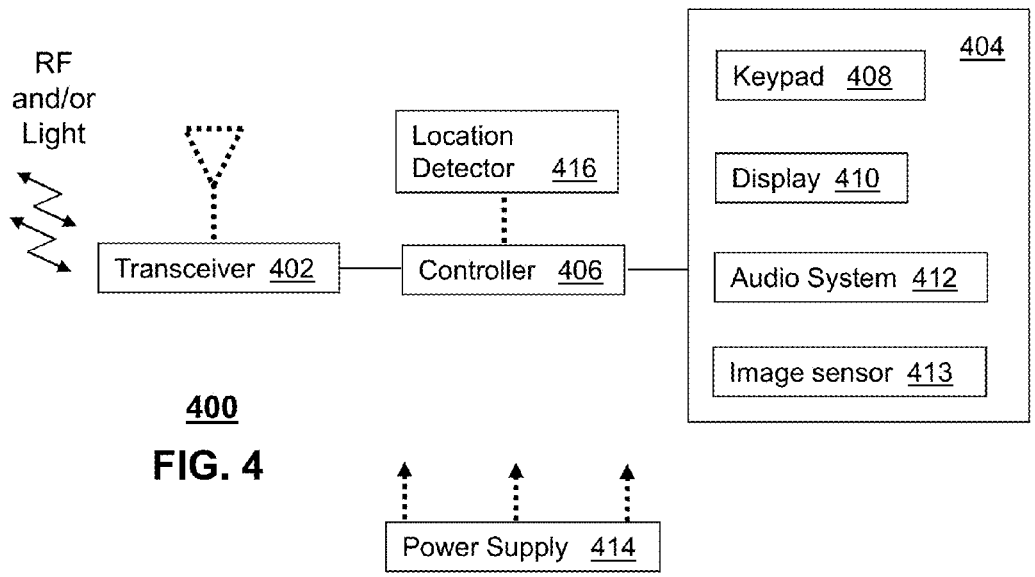
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2 and other communications described herein. The communication device 400 can comprise a wireline and/or wireless transceiver 402 (herein transceiver 402), a user interface (UI) 404, a power supply 414, a location detector 416, and a controller 406 for managing operations thereof. The transceiver 402 can support short-range or long-range wireless access technologies such as infrared, Bluetooth, WiFi, Digital Enhanced Cordless Telecommunications (DECT), or cellular communication technologies, just to mention a few. Cellular technologies can include, for example, CDMA-1×, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio for hands free operation. The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location detector 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
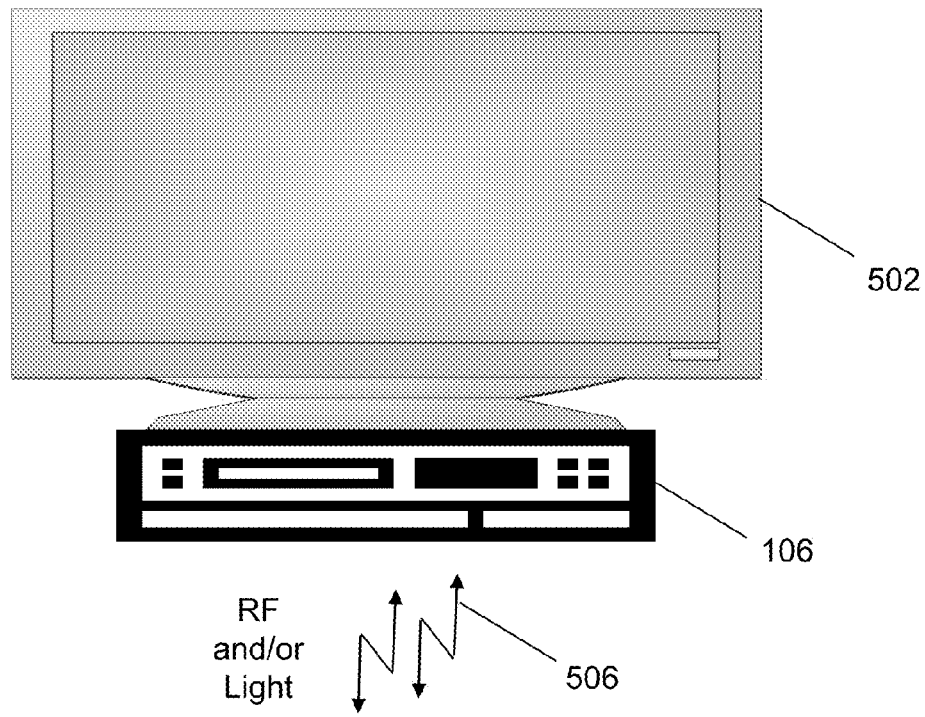
FIG. 5 depicts an illustrative embodiment of a presentation device and media processor for presenting media content.

FIG. 5 depicts an illustrative embodiment of a presentation device 502 and media processor 106 for presenting media content. In the present illustration, the presentation device 502 is depicted as a television set. It will be appreciated that the presentation device 502 alternatively can represent a portable communication device such as a cellular phone, a PDA, a computer, or other computing device with the ability to display media content. The media processor 106 can be an STB such as illustrated in FIG. 1, or some other computing device such as a cellular phone, computer, gaming console, or other device that can process and direct the presentation device 502 to emit images associated with media content. It is further noted that the media processor 106 and the presentation device 502 can be an integral unit. For example, a computer or cellular phone having computing and display resources collectively can represent the combination of a presentation device 502 and media processor 106.

Figure 6:
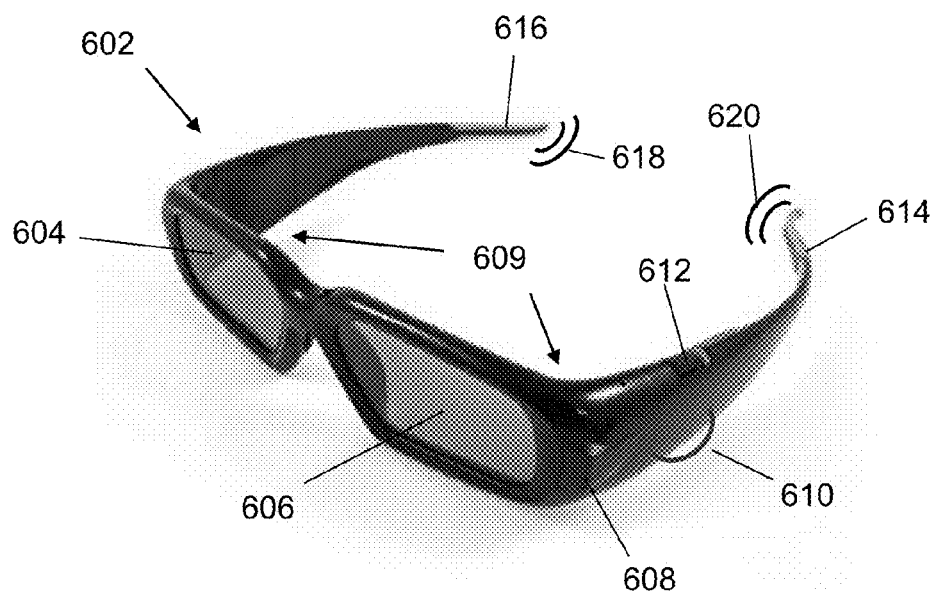
FIG. 6 depicts an illustrative embodiment of a viewing apparatus.

The media processor 106 can be adapted to communicate with accessories such as the viewing apparatus 602 of FIG. 6 by way of a wired or wireless interface. A wired interface can represent a tethered connection from the viewing apparatus to an electro-mechanical port of the media processor (e.g., USB or proprietary interface). A wireless interface can represent a radio frequency (RF) interface such as Bluetooth, WiFi, Zigbee or other wireless standard. The wireless interface can also represent an infrared communication interface. Any standard or proprietary wireless interface between the media processor 106 and the viewing apparatus 602 is contemplated by the presented disclosure.

The viewing apparatus 602 can represent an apparatus for viewing two-dimensional (2D) or three-dimensional (3D) stereoscopic images which can be still or moving images. The viewing apparatus 602 can be an active shutter viewing apparatus. In this embodiment, each lens has a liquid crystal layer which can be darkened or made to be transparent by the application of one or more bias voltages. Each lens 604, 606 can be independently controlled. Accordingly, the darkening of the lenses can alternate, or can be controlled to operate simultaneously.

Each viewing apparatus 602 can include all or portions of the components of the communication device 400 illustrated in FIG. 4. For example, the viewing apparatus 602 can utilize the receiver portion of the transceiver 402 in the form of an infrared receiver depicted by the window 608. Alternatively, the viewing apparatus 602 can function as a two-way communication device, in which case a full infrared transceiver could be utilize to exchange signals between the media processor 106 and the viewing apparatus 602. It is contemplated that the transceiver 402 can be replaced with a unidirectional RF receiver or a bidirectional RF transceiver.

Window 608 can also include one or more common light sensors that measure ambient light and/or measure light signals supplied from the presentation device 502. Alternatively or in combination, one or more light sensors can also be placed on an inner portion 609 of the viewing apparatus 602 to measure light supplied by the optical elements 604, 606 or reflections of light from a user's eyes (e.g., sclera or eyelid flesh). The measurements of light generate illumination information which can be transmitted to the media processor 106.

The viewing apparatus 602 can utilize a controller 406 to control operations thereof, and a portable power supply (not shown). The viewing apparatus 602 can have portions of the UI 404 of FIG. 4. For example, the viewing apparatus 602 can have a multi-purpose button 612 which can function as a power on/off button and as a channel selection button. A power on/off feature can be implemented by a long-duration depression of button 612 which can toggle from an on state to an off state and vice-versa. Fast depressions of button 612 can be used for channel navigation. Alternatively, two buttons can be added to the viewing apparatus 602 for up/down channel selection, which operate independent of the on/off power button 612. In another embodiment, a thumbwheel can be used for scrolling between channels. Additional buttons, a scroll wheel or other common manipulative devices (not shown) can be added to the viewing apparatus 602 to also control light intensity produced by the presentation device 502. For example increase and decrease buttons can be used to submit illumination requests to the media processor 106 over a wireless or wired medium as previously described. Alternatively or in combination any of the aforementioned functions of the UI 404 of the viewing apparatus can be controlled by speech detection.

It is further noted that illumination information generated by the light sensor(s) and requests for a change in light intensity can be submitted in combination to the media processor 106, presentation device 502 or combinations thereof.

The viewing apparatus 602 can also include an audio system 412 with one or more speakers in the extensions of the housing assembly such as shown by references 616, 614 to produce localized audio 618, 620 near a user's ears. Different portions of the housing assembly can be used to produce mono, stereo, or surround sound effects. Ear cups (not shown) such as those used in headphones can be used by the viewing apparatus 602 (as an accessory or integral component) for a more direct and low-noise audio presentation technique. The volume of sound presented by the speakers 614, 616 can be controlled by a thumbwheel 610 (or up/down buttons—not shown).

It would be evident from the above descriptions that many embodiments of the viewing apparatus 602 are possible, all of which are contemplated by the present disclosure.

Figure 7:
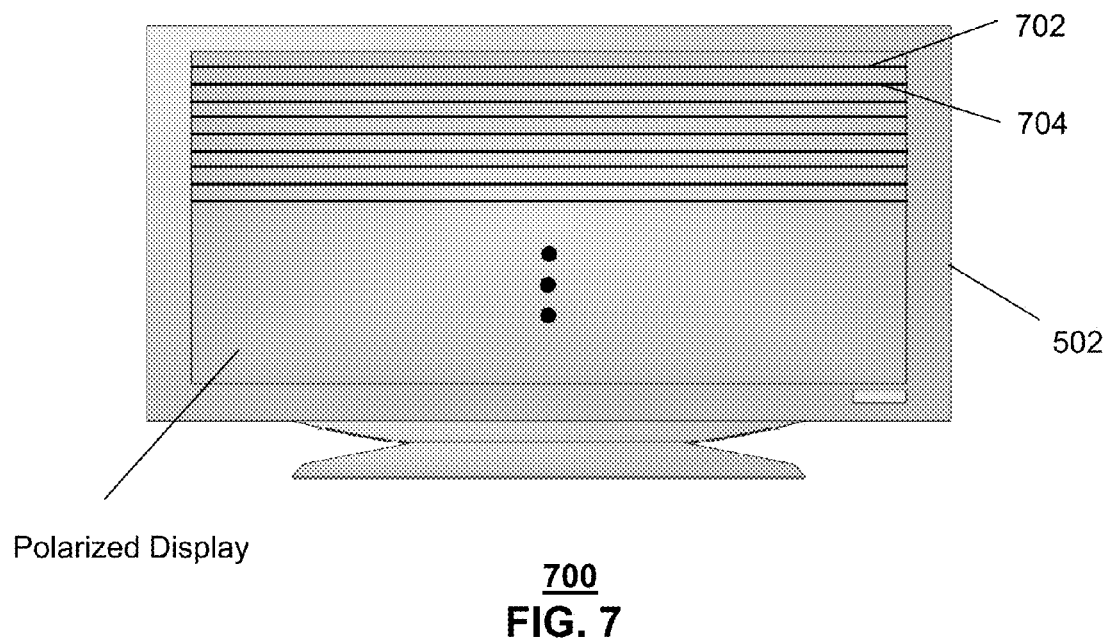
FIG. 7 depicts an illustrative embodiment of a presentation device with a polarized display.

FIG. 7 depicts an illustrative embodiment of the presentation device 502 of FIG. 5 with a polarized display. A display can be polarized with polarization filter technology so that alternative pixel rows can be made to have differing polarizations. For instance, odd pixels rows can be polarized for viewing with one polarization filter, while even pixels rows can be polarized for viewing with an alternative polarization filter. The viewing apparatus 602 previously described can be adapted to have one lens polarized for odd pixel rows, while the other lens is polarized for viewing even pixel rows. With polarized lenses, the viewing apparatus 602 can present a user a 3D stereoscopic image.

Figure 8:
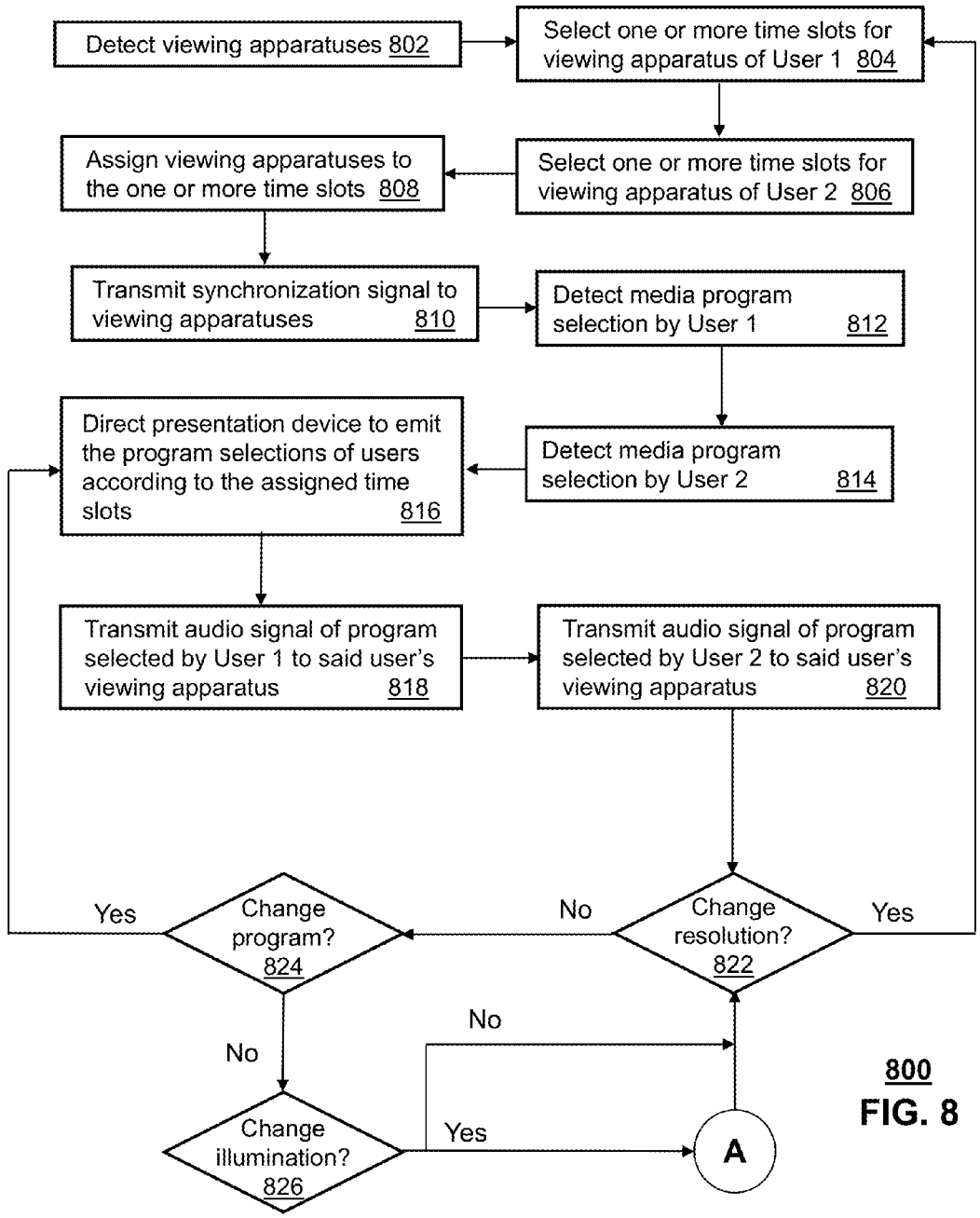
FIGS. 8-9 depict illustrative embodiments of a method operating in portions of the devices and systems of FIGS. 1-7.
Figure 9:
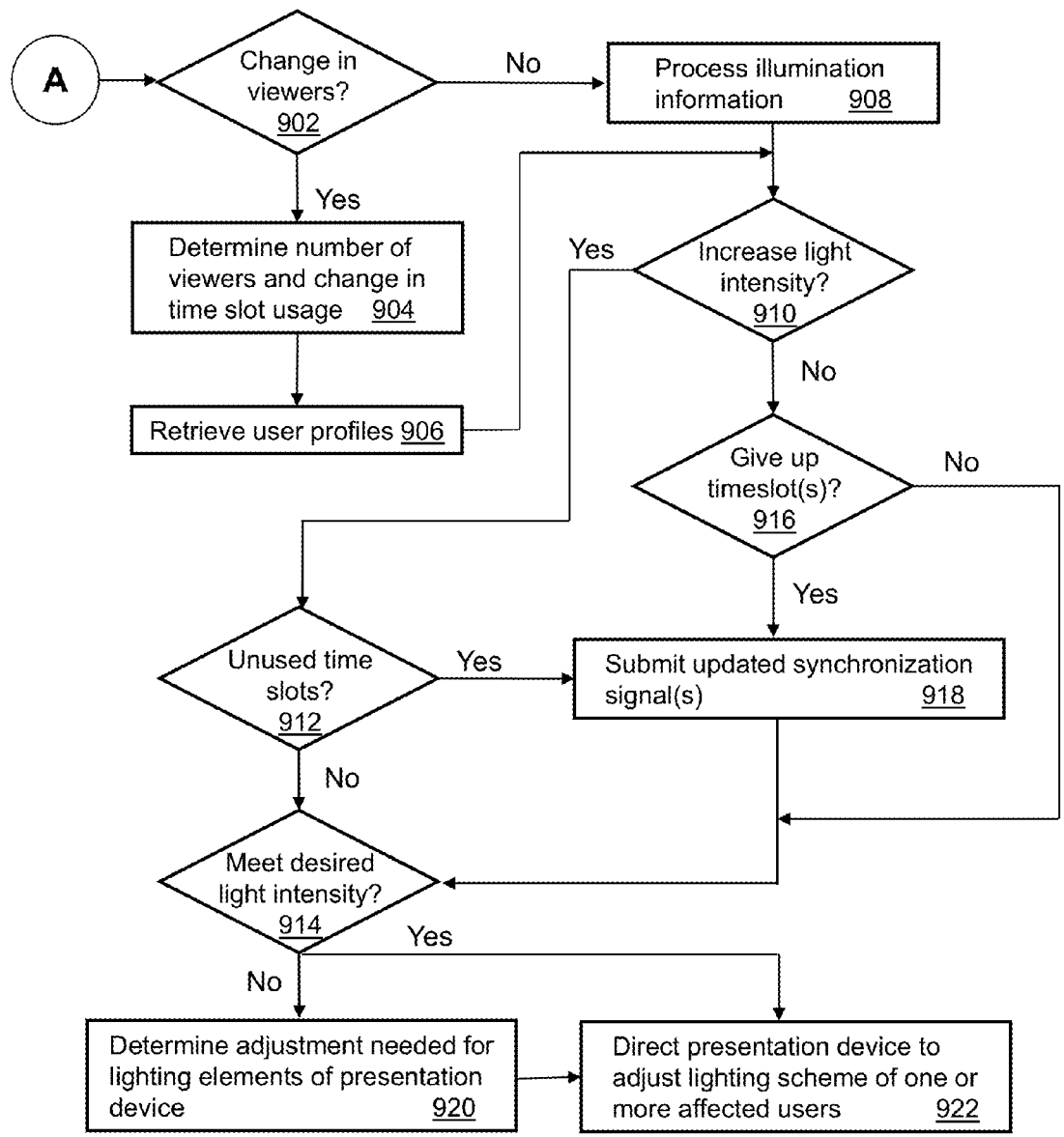

FIG. 8 depicts an illustrative embodiment of a method 800 operating in portions of the devices and systems described herein and/or illustrated in FIGS. 1-7. Method 800 can begin with step 802 in which a media processor 106 (such as an STB 106) detects a plurality of viewing apparatuses such as the viewing apparatus 602 of FIG. 6. For illustration purposes only, the media processor 106 and the viewing apparatuses 602 will be referred to hereinafter as the STB 106 and shutter glasses 602, respectively, although it is well understood that these terms have a broader meaning.

The detection of the shutter glasses 602 in step 802 can take place by way of a user of each set of shutter glasses 602 notifying the STB 106 of the presence of such device. The notification process can take place with a remote controller 107 that navigates through a user interface presented by the STB 106 by way of a presentation device 502 such as a TV set (hereinafter referred to as TV set 502 for illustration purposes only). Alternatively, the shutter glasses 602 can be detected by an RF or infrared (IR) signal transmitted to the STB 106 by the shutter glasses 602.

For illustration purposes, assume that only two shutter glasses are detected. In steps 804 through 808 the STB 106 can select and assign each shutter glass 602 to one or more time slots. In step 810, the STB 106 can transmit to each shutter glass a synchronization signal over the RF or IR interface. The synchronization signal can include an identifier for each shutter glass 602 (e.g., shutter glass ID 1, and shutter glass ID 2), a designation of one or more periodic time slots assigned to each shutter glass, and the frequency of these time slots (e.g., 32 frames per second).

In steps 812, 814 the STB 106 can further detect a program selection by each user. The selections can be detected from RF or IR signals transmitted by a remote controller 107 utilized by each user. Each remote controller 107 can be identified by a unique identifier. Alternatively, or in combination, each shutter glass 602 can have one or more channel selection buttons for scrolling through channels presented at the TV set 502 by the STB 106. A program selection in the present context can represent one of many selectable media programs supplied to the STB 106 by one of the media communication systems referred to in FIGS. 1-3, or media programs stored in the STB's local memory. A media program can represent a live TV channel (e.g., ESPN), a pre-recorded program stored in a DVR of the STB 106, personal media content such as pictures or videos stored in the STB, or any other source of media content that is presentable on TV set 502. Generally speaking, a media program can represent any form of viewable media content which can have still or moving images.

Once a media program selection has been detected for each shutter glass 602, the STB 106 can direct the TV set 502 in step 816 to emit images of each program according to the time slots assigned to each set of shutter glasses 602. In steps 818, 820, time-synchronized audio signals can be transmitted to the shutter glasses 602 of Users 1 and 2 by way of RF or IR signals. The shutter glasses 602 can each process the audio signal with a built-in audio system such as described for reference 412 of FIG. 4 for presenting low-volume audio associated with the selected program by way of the audio speakers located on the extensions 616, 614 of the shutter glasses 602. Volume can be controlled at each of the shutter glasses 602 by way of the volume control 610. By utilizing low volume audio, each user can receive a private audio presentation of the program, thereby not disturbing another user viewing a different program.

Assume for illustration purposes that the media program selected by each user is a 3D video program with right and left images having different perspectives for stereoscopic viewing. The STB 106 can select for user 1 time slot 1 for viewing left video images and time slot 2 for viewing right video images, each time slot having a frame rate of 32 frames per second. Similarly, the STB 106 can select for user 2 time slot 3 for viewing left video images and time slot 4 for viewing right video images, each time slot also having a frame rate of 32 frames per second. Suppose a TV set 502 has a frame rate of 256 frames per second. At this rate, the TV set 502 can be adapted to support 8 time slots each operating at 32 frames per second. In this configuration, each time slot would have a duration of approximately 488 microseconds (us).

The above configuration can support up to four 3D programs which can be viewed simultaneously with active shutter glasses 602 synchronized to pairs of time slots associated with each program. In the illustration of FIG. 1, two users utilize four time slots: time slots 1 and 2 for User 1, and time slots 3 and 4 for User 2. Time slots 5 through 8 are available for other users. Suppose that User 1 chose channel 8 of the STB 106 which supports a live 3D video program, and further suppose that User 2 chose channel 6 to also view a live 3D video program. During time slot 1, the shutter glasses 602 of User 1 would enable viewing of the image presented by the TV set 502 on the left lens 606 while maintaining the right lens 604 darkened (disabled). It should be noted that no other images are presented by the TV set 502 during time slot 1. In other words, during time slot 1 the STB 106 will not direct the TV set 502 to present images from the program selected by User 2 on channel 6 or images associated with the right eye for channel 8. User 2's shutter glasses maintain both lenses 604 and 606 darkened (disabled) during time slot 1. Hence, User 2 would not be able to view the left eye image of time slot 1.

Upon entering time slot 2, the STB 106 can direct the TV set 502 to present the right eye frame of channel 8 only. The shutter glass 602 of User 1 having been synchronized in step 810 to the frame rate of the TV 502, and knowing its assigned time slots (1 and 2), and their respective rates, would enable the right viewing lens 604, and darken (or disable) the viewing left eye lens 606 during time slot 2. Hence, User 1 would only be able to view the image presented on the TV 502 by way of the right lens 604. Again, User 2's shutter glasses would maintain both lenses 604 and 606 darkened (disabled) during time slot 2. Hence, User 2 would not be able to view the right eye image of channel 8 during time slot 2.

Upon entering time slot 3, the STB 106 can direct the TV set 502 to present the left eye frame of channel 6 only. The shutter glass 602 of User 2 having been synchronized in step 810 to the frame rate of the TV 502, and knowing its assigned time slots (3 and 4), and their respective rates, would enable the left viewing lens 606, and darken (or disable) the viewing right eye lens 604. Hence, User 2 would only be able to view the image presented on the TV 502 by way of the left lens 606. User 1's shutter glasses would maintain both lenses 604 and 606 darkened (disabled) during time slot 3. Hence, User 1 would not be able to view the left eye image of time slot 3.

Upon entering time slot 4, the STB 106 can direct the TV set 502 to present the right eye frame of channel 6 only. The shutter glass 602 of User 2 would enable the right viewing lens 604, and darken (or disable) the viewing left eye lens 606. Hence, User 2 would only be able to view the image presented on the TV set 502 by way of the right lens 604. User 1's shutter glasses would maintain both lenses 604 and 606 darkened (disabled) during time slot 4. Hence, User 1 would not be able to view the right eye image of time slot 4.

Since only one user can view one time slot with a single eye at a time, the full resolution of the TV set 502 can be viewed by each of Users 1 and 2. If the TV set 502 can support high definition resolution (e.g., 1080P), a 3D program can be viewed with the same resolution. This is in contrast with a TV set 502 having a polarized display as shown in FIG. 7. When viewing a polarized TV set, only half of the rows can be seen by each eye. Therefore, a 3D image can only be viewed with half resolution.

In another embodiment, the shutter glasses 602 of FIG. 6 can be adapted so that each lens is polarized to alternating pixel rows of the polarized TV set 502 of FIG. 7. In this embodiment, the left lens, for example, can be polarized to odd pixel rows 702, while the right lens can be polarized to the even pixel rows 704. Since each eye is polarized to different pixel rows, the shutter glasses 602 can be adapted to enable viewing from both lenses 604, 606 simultaneously. Although half the resolution of the polarized TV set 502 is viewable by each eye, this embodiment requires only one time slot for left and right eye viewing. Accordingly, this embodiment allows the STB 106 to present eight programs, each assigned to one of time slots 1 through 8. With the four time slots illustrated in FIG. 10, four users can be viewing different programs in half 3D resolution as depicted in the timing diagram of FIG. 11.

Figure 10:
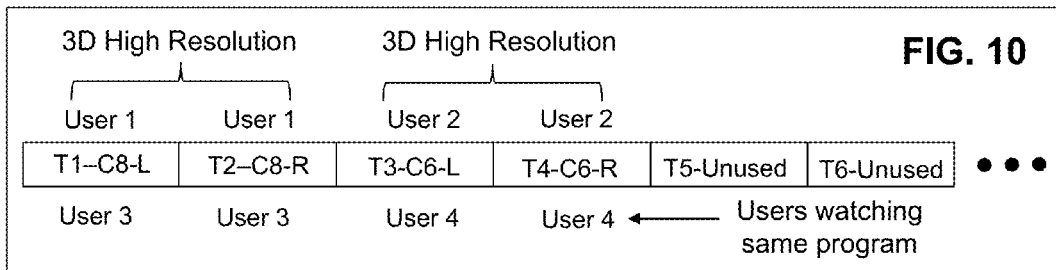
FIGS. 10-14 depict illustrative timing diagrams for presenting media content to multiple viewers.
Figure 11:
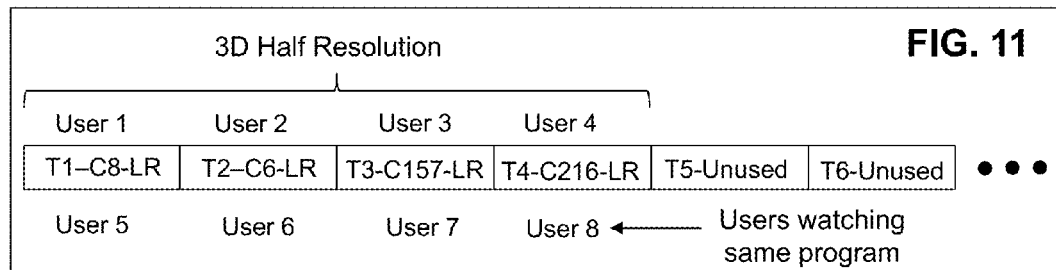

The embodiments of FIGS. 10 and 11 support more than one user viewing the same program. For example, in the illustration of FIG. 10, Users 1 and 3 can be viewing 3D channel 8, while Users 2 and 4 can be viewing 3D channel 6. Users 3 and 4 can use shutter glasses 602 synchronized to time slots 1-2, and 3-4, respectively. Similarly, with a polarized TV 502, multiple viewers are possible as shown by the addition of viewers 5-8 each utilizing shutter glasses synchronized to time slots 1-4, respectively. Accordingly, any number of duplicate viewers is possible.

The aforementioned embodiments can also be adapted for multiple program viewing of combinations of 2D and 3D configurations. For instance, in the case of a non-polarized TV set 502 as illustrated by the timing diagram of FIG. 11, the shutter glasses of User 1 can be programmed so that the left and right eye lenses 604, 606 are enabled simultaneously in time slot 1. During time slot 1, the STB 106 can be programmed to present a full resolution 2D image. During the other time slots (2-8), the shutter glasses 602 of User 1 are disabled (darkened). More than one viewer can have shutter glasses 602 synchronized to the same arrangement as another user. In this illustration, Users 1 and 4 are viewing the same program (channel 8) in 2D full resolution, while Users 3 and 6 view a 3D program in full resolution (channel 6) at the same time.

Figure 12:
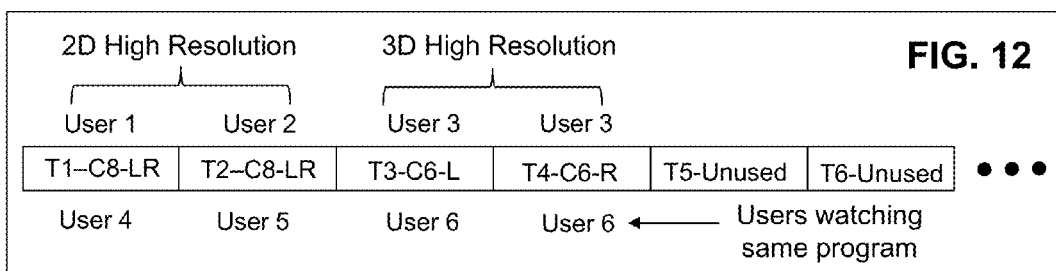
Figure 13:
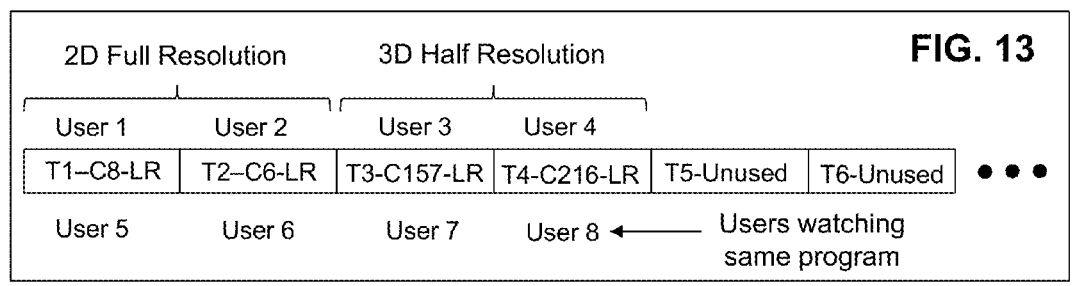

For a polarized TV set 502 as illustrated by the timing diagram of FIG. 12, the STB 106 can be programmed to present a 2D image that utilizes the odd and even pixel rows. Since all pixel rows are used, the 2D image has full resolution, while 3D images are half resolution since the right and left eye images are split between the odd and even pixel rows. As described before, the left and right lenses are enabled simultaneously during each time slot. And as before, more than one viewer can have shutter glasses synchronized to the same time slot. Users 1 and 5 view channel 8 in 2D full resolution, Users 2 and 6 view channel 6 in 2D full resolution, while Users 3 and 7 view channel 157 in 3D half resolution, and Users 4 and 8 view channel 216 in 3D half resolution.

Switching from 3D to 2D resolution and vice-versa can be performed with a remote controller 107 or with a toggle button on the shutter glasses 602 (not shown in FIG. 6). When a 3D to 2D or 2D to 3D change request is detected by the STB 106 in step 822, the STB 106 can repeat steps 804 through 820 and thereby resynchronize the shutter glasses 602 of the user to a new assignment of one or more time slots for 2 or 3D viewing. Similarly, a change in programming can be performed with a remote controller 107 and/or with channel change buttons on the shutter glasses 602. When a program change request is detected by the STB 106 in step 824, the STB 106 can repeat steps 816 through 820 and thereby present the shutter glasses 602 of the user with a new program.

If a change in media program is not detected in step 824, the STB 106 can determine in step 826 whether an illumination change is required. An illumination change can represent numerous embodiments. For example, a user can manipulate or verbally control the user interface 404 of the viewing apparatus 602 and thereby direct a change in illumination (e.g., increase or decrease light intensity of the image projected by the presentation device 502 in the time slots assigned for the particular user). In another embodiment, the viewing apparatus 602 can be adapted to periodically send illumination data associated with different locations of the viewing apparatus (before and after the optical elements 604, 606 as previously described). The illumination data can represent ambient light, specific spectral portions of light emitted by the presentation device 502, and/or light intensity reflected from the user's sclera or eyelid flesh.

A change in illumination can also be detected from a change in utilization. If for example a user terminates viewing of a media program and thereby frees time slots, a change in illumination is possible. Similarly, if a new user wearing a viewing apparatus requests another media program requiring the use of additional time slots, such a change can result in an adjustment to illumination.

Illumination data submitted by each viewing apparatus 602 can be autonomous and/or under the control of the STB 106 by way of bi-directional message exchanges over a wired or wireless medium.

In view of the above embodiments, an artisan of ordinary skill in the art would contemplate numerous causes for an illumination change. Additional embodiments are therefore contemplated by the present disclosure.

Once an illumination change is detected in step 824, the STB 106 can be adapted to determine in step 902 whether a change in viewers is a cause of the illumination change. If it is, the STB 106 then determines in step 904 the number of viewers and any changes in time slot usage. In step 906 the STB 106 can further retrieve any user profiles associated with the viewers. The user profiles can identify viewing preferences such as contrast, light intensity in a dark room versus a well lit room, among other possible preferences. In step 910, the STB 106 can determine if the addition or departure of users, each of which may cause a change in time slot usage, requires an increase in the intensity of light emitted for particular media programs viewed by current users.

If for example previously used time slots have been released by a user who has terminated a media program, and the remaining viewer(s) could benefit from an increase in the intensity of light emitted for the respective media program (s) being viewed by them, then the STB 106 can detect this opportunity in step 910 and determine in step 912 that such unused time slots are available to update the illumination of said programs. When an unused time slot is used for this purpose, the STB 106 can submit in step 918 updated synchronization signals to the affected viewing apparatuses 602 to synchronize to a new time slot assignment scheme. In step 914, the STB 106 can then determine if the updated use of time slots is sufficient to meet a desired level of light intensity identified by a user's profile preferences. If it does, the STB 106 can proceed to step 922 and direct the presentation device 502 to adjust its lighting scheme for the one or more affected users according to a new time slot arrangement.

If the use of additional time slots falls short of a user's desired light intensity, the STB 106 can proceed to step 920 where it determines a degree of adjustment needed for lighting elements (e.g., LEDs, plasma cells, etc.) of the presentation device 502 to achieve the desired light intensity. In this embodiment, the STB 106 can direct the presentation device 502 to present a media program utilizing additional time slots with an additional adjustment in the intensity of light emitted by the lighting elements of the presentation device 502 to make up for any shortfall in the time slot arrangement.

The aforementioned embodiment can also be applied to circumstances where a decrease in light intensity is required. For example the STB 106 can determine in step 910 that the user has turned off or turned down lighting in a room, thus requiring less light intensity in the media program being presented. Under these circumstances, the STB 106 can proceed to step 916 where it determines if time slots are available to be given up. If the minimum required are in use, then the STB 106 can proceed to steps 914-922 to decrease the intensity of light generated by the lighting elements of the presentation device 502 without an adjustment to the time slots. In this embodiment resynchronization of the viewing apparatuses is not necessary, and thus step 918 is not required.

If the viewing apparatus 602 is synchronized to more time slots than required (e.g., two time slots for the left eye, and two for the right), then the STB 106 can proceed to step 918 where it submits an updated synchronization signal to the affected viewing apparatus(es) 602 and proceeds to steps 914 for further adjustment if the decrease in light intensity falls short of a desired target, or if the decrease in light intensity by reducing the number of time slots is more than desired, in which case the STB 106 directs the presentation device 502 to increase the light intensity generated by the lighting elements during the assigned time slot arrangement.

Referring back to step 902, if the illumination change is the result of a proactive request of a user manipulating the user interface 404 of the viewing apparatus 602 to request an increase or decrease in illumination, the STB 106 can process this request in step 908 and proceed to any combination of steps 910-922 to achieve the requested adjustment. Alternatively or in combination if the change in illumination is a result of autonomous illumination measurements submitted to the STB 106 by the viewing apparatus 602 or measurements requested by the STB 106, the STB 106 can process the illumination data in step 908, retrieve user profiles where appropriate to determine if an increase or decrease in illumination is required in step 910 and repeat any combination of the steps previously described.

Figure 14:
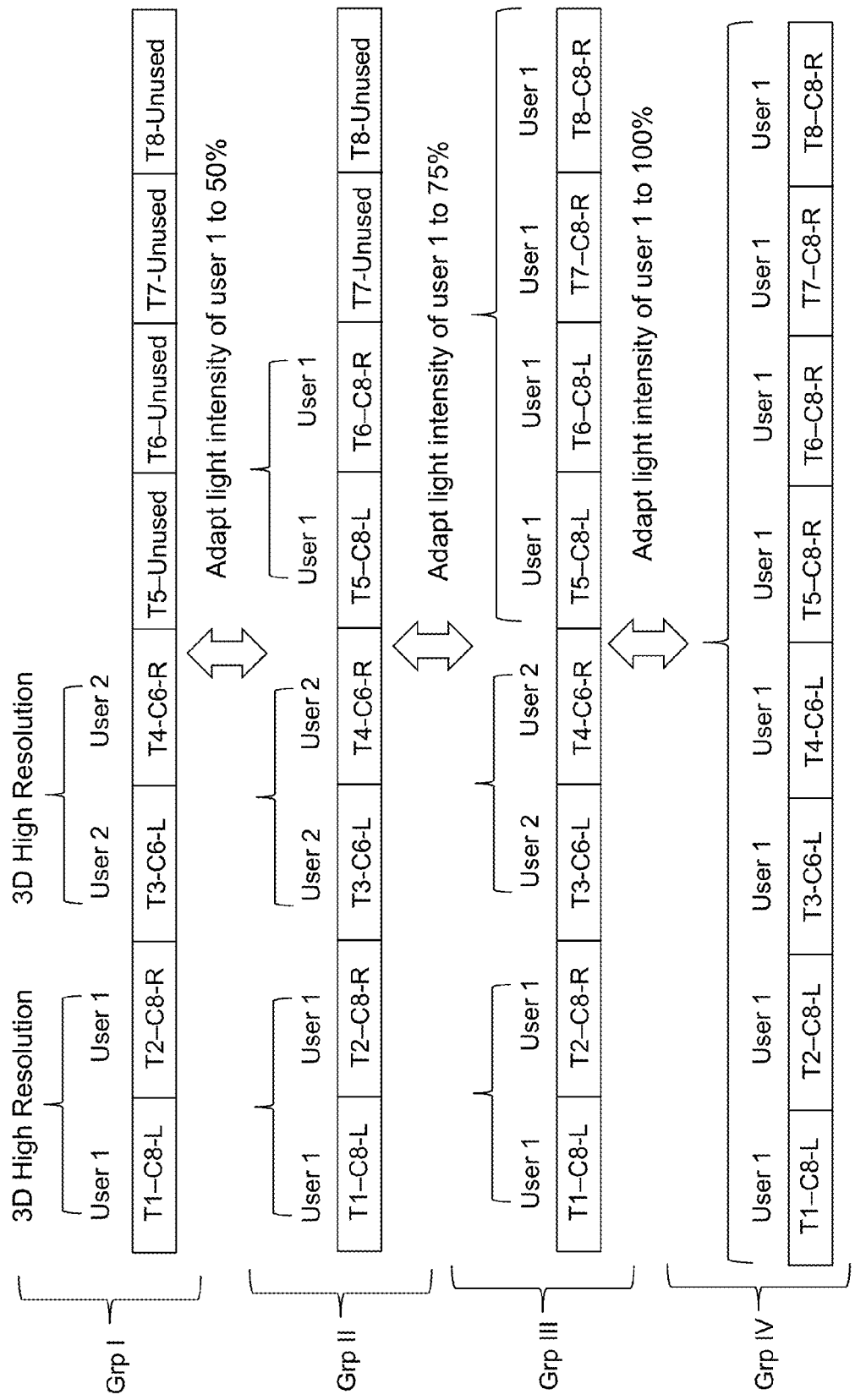

FIG. 14 illustrates a few of the embodiments described above. In this illustration four timing groups are shown (Grp I, II, III and IV) each representing a transition between time slot schemes. Group I can represent for example the initial state of two users viewing two independent media programs with overlapping presentation schedules. User 1 is viewing a 3D high resolution program on channel 8 during time slots 1 and 2, while User 2 is viewing a media program at the same resolution on channel 6 during time slots 3 and 4.

In Group II, User 1 is assumed to have requested an increase in the light intensity of the media program of channel 8. This request can be generated by a manipulation of the user interface 404 of the viewing apparatus 602 of user 1 as previously described. The STB 106 can determine as described by method 900 the availability of time slots 5 and 6 in Group I and replicate the left and right images in Group II as shown during time slots 5 and 6, respectively. To accomplish this, the STB 106 transmits a synchronization signal to the viewing apparatus 602 of user 1 so that it can now enable the optical elements during time slots 1, 2, 5 and 6.

In Group I user's 1 and 2 achieve 25% of the light intensity available by time slot management. By supplying time slots 5 and 6, user 1 sees 50% of the available light intensity while user 2 remains at 25%. If more intensity is required, time slots 7 and 8 can also be made available, which increases the intensity of light provided to 75% for user 1. If user 2 terminates its viewing of channel 6 without switching to another channel, thereby relinquishing time slots 3 and 4, then the whole spectrum of time slots can be assigned to the viewing apparatus of user 1 thereby providing said viewer 100% of the light intensity which can be managed with time slots.

This illustration can be carried in any direction or combination. For example, the light intensity presented to user 1 can be decreased by transitioning from group IV to group I in sequence or with gaps. It is further noted that if the light intensity desired by a user cannot be achieved with time slot management, the STB 106 can direct the presentation device 502 to adjust the lighting elements during the user's time slot(s) to make up for a shortfall or to adjust for an overshoot.

Upon reviewing the aforementioned embodiments, it would be evident to an artisan with ordinary skill in the art that said embodiments can be modified, reduced, or enhanced without departing from the scope and spirit of the claims described below. For instance, the control and sensing of light illumination can be placed on a remote controller carried by a user of the viewing apparatus and therewith submit signals to the STB 106 to achieve the desired effects described by method 900 as illustrated in part by FIG. 14.

The embodiments described above can be adapted to operate with any device capable of performing in whole or in part the steps described for method 800. For example, a cellular phone can be adapted to present two or more users wearing shutter glasses multiple programs on a single display that supports a high frame rate (e.g., 128 frames per second). Synchronization and audio signals can be transmitted to shutter glasses over for example a Bluetooth interface. Similar adaptations can be applied to media processors and presentation devices located in automobiles, airplanes or trains, just to mention a few.

In another embodiment, method 800 can be adapted to present multiple programs on a TV set utilizing autostereoscopic technology. Depending on the physical location of each user, a TV set with autostereoscopic technology can present different programs each directed to viewing zones (e.g., five 30 degree viewing zones) for viewing programs in 3D or 2D formats in each of said zones. Since autostereoscopic technology does not require shutter glasses, a user can view a program privately with only audio headphones. A user can transition between programs by physically moving between viewing zones.

Figure 15:
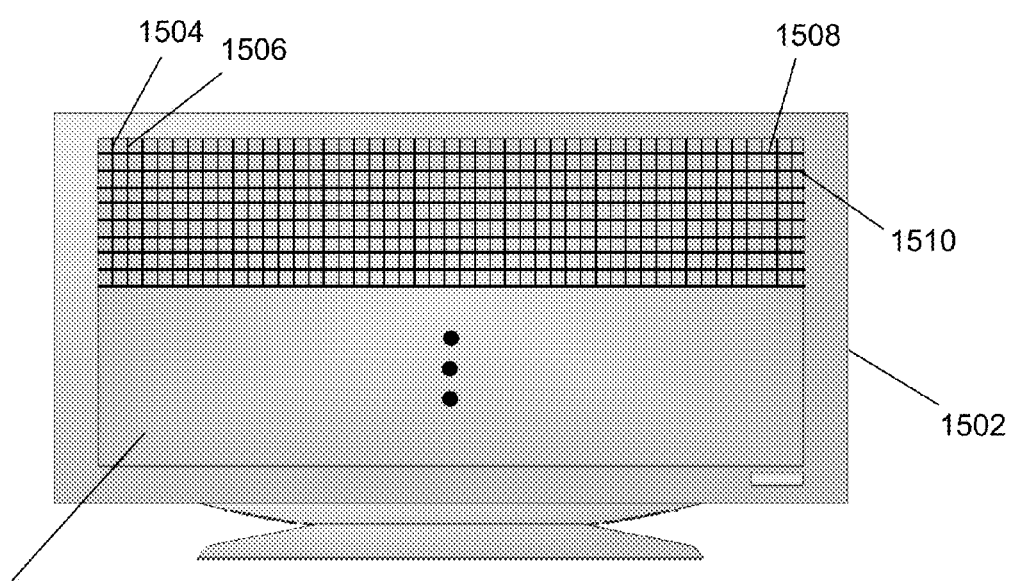
FIG. 15 depicts an illustrative embodiment of a presentation device with a polarized display.

In yet another embodiment, a presentation device 1502 such as shown in FIG. 15 can be polarized for independent viewing of pixel rows and/or columns with passive polarized glasses (i.e., no need for active shutter lenses). In this embodiment, a presentation device 1502 with a high density of pixel rows or columns can be adapted to present two or more unassociated media programs with overlapping presentation schedules which can be independently viewed by each user with polarized glasses.

In the present context, unassociated media programs can represent, for example, media programs having related content but different versions of the content such as a motion picture in which a first media program of the motion picture is R-rated, while the second media program of the motion picture is PG-13 rated with modified scenes and/or removed scenes. In another embodiment, unassociated media programs can represent, for example, two or more media programs with unrelated content (e.g., user recorded vacation video, user captured still images, HBO movie, DVR recorded program, etc.). Other variants of media programs are contemplated as possible embodiments of unassociated media programs.

In one embodiment, a first set of polarized glasses can have left and right lenses polarized equally for viewing odd pixel rows 1508 while another set of polarized glasses can have left and right lenses polarized equally for viewing even pixel rows 1510. In this scheme, media programs can be viewed in 2D. By further subdividing pixel rows, stereoscopic 3D images can be presented. For example suppose odd pixel rows are dedicated to one media program (HBO), and even pixel rows are dedicated to another unassociated media program (ESPN). For the odd pixel rows, a 3D image can be presented by presenting left and right eye stereoscopic images in alternating rows with the set of odd rows. Similarly, for the even pixel rows, a 3D image can be presented by presenting left and right eye stereoscopic images in alternating rows of the set of even pixel rows. The aforementioned embodiments can be adapted to a scheme in which odd and even pixel columns 1504, 1506 can be utilized in a similar manner to the odd and even pixel row scheme described above for presenting 2D and 3D images.

With these principles in mind, method 800 can be adapted so that an STB 106 can direct the presentation device 1502 to present a first media program in odd pixel rows, while presenting another media program unassociated to the first media program in even pixel rows while both programs have overlapping presentation schedules, which if viewed with the naked eye would seem unintelligible or distorted. Under these circumstances, a first user can view the first media program with glasses polarized to odd pixel rows without being able to view the second media program. A second user can view the second media program with glasses polarized to even pixel rows without being able to view the first media program. Method 800 can be further adapted to present the first and/or second media programs in 2D or 3D formats as previously described.

It should be noted that as presentation devices increase in resolution, additional polarization filtering of pixel rows and/or columns can be used to support viewing with polarized glasses more than two media programs with overlapping presentation schedules.

The foregoing embodiments illustrate that time division, space division, or viewer location dependency can facilitate a novel means for presenting multiple programs with overlapping presentation schedules which can be independently viewed on the same presentation device.

It is also noted that any of the embodiments presented by the present disclosure can be adapted to manipulate light waves associated with the images presented to each user. For instance, the more pixels are viewable by a user in one or more of the aforementioned embodiments, singly or in combination, the greater the intensity of the images. Accordingly, color, contrast and other imaging control functions can be manipulated by the embodiments presented herein.

It is further noted that the embodiments presented herein can operate in any device. For instance, method 800 can be adapted to operate in whole or in part at a network element of communication system 100 (e.g., at the VHS 114) rather than at a device such as the STB 106 in premises 102. Similar adaptations of the embodiments presented herein are contemplated for communication systems 200 and 300, and communication device 400. Combinations of these adaptations are also contemplated by the present disclosure.

In sum, there are countless embodiments which are contemplated by the present disclosure which for practical reasons cannot be disclosed in there totality. Accordingly, any modulation or functional scheme capable of producing the same or similar results to the embodiments described herein are contemplated by the present disclosure.

It would therefore be apparent to an artisan with ordinary skill in the art that other suitable modifications can be applied to the present disclosure without departing from the scope of the claims below. Accordingly, the reader is directed to the claims section for a fuller understanding of the breadth and scope of the present disclosure.

Figure 16:
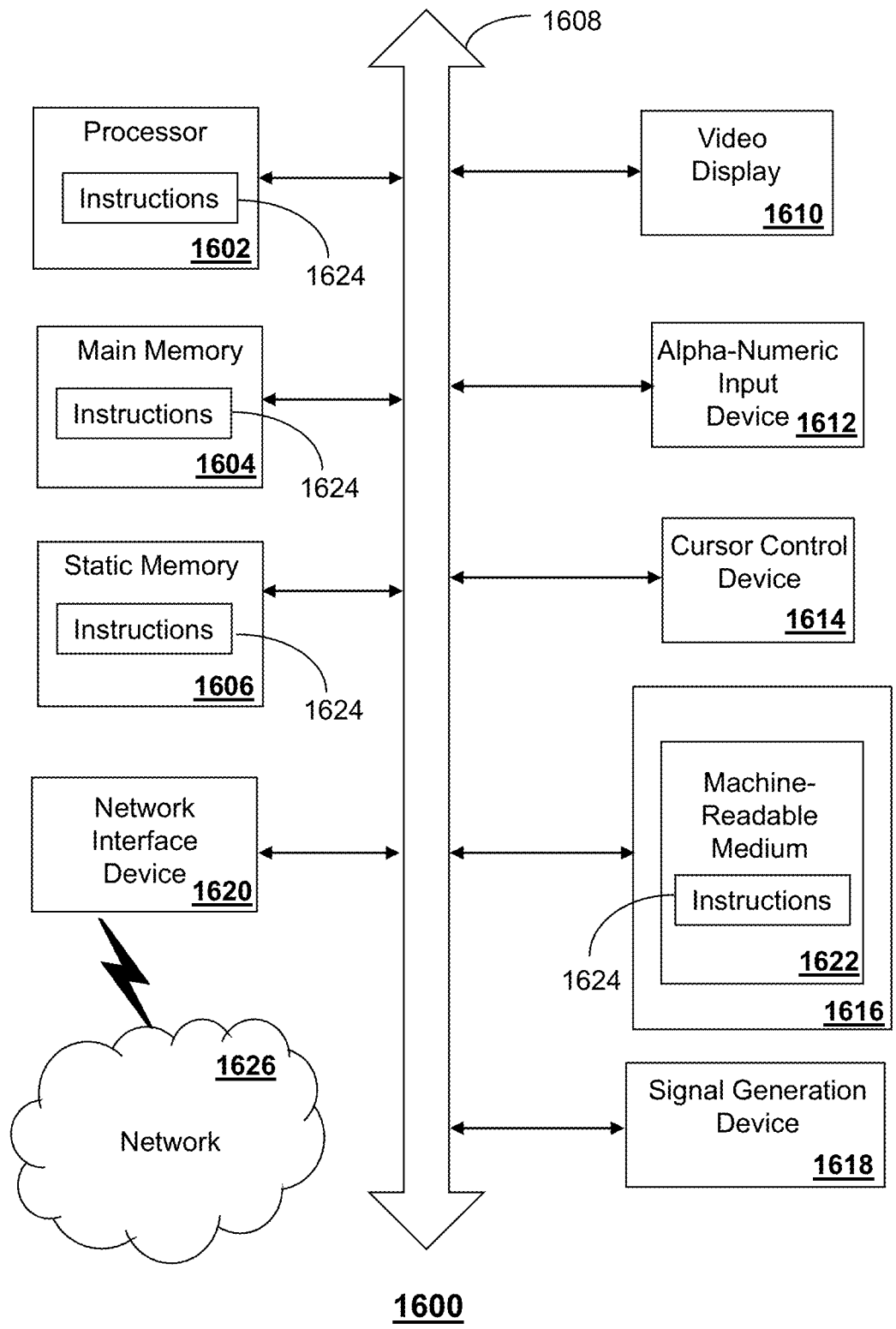
FIG. 16 is a diagrammatic representation of a machine in the form of a computer system within which a set of instructions, when executed, may cause the machine to perform any one or more of the methodologies discussed herein.

FIG. 16 depicts an exemplary diagrammatic representation of a machine in the form of a computer system 1600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1600 may include a processor 1602 (e.g., a central processing unit (CPU), a graphics processing unit (GPU, or both), a main memory 1604 and a static memory 1606, which communicate with each other via a bus 1608. The computer system 1600 may further include a video display unit 1610 (e.g., a liquid crystal display (LCD), a flat panel, a solid state display, or a cathode ray tube (CRT)). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620.

The disk drive unit 1616 may include a machine-readable medium 1622 on which is stored one or more sets of instructions (e.g., software 1624) embodying any one or more of the methodologies or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1624, or that which receives and executes instructions 1624 from a propagated signal so that a device connected to a network environment 1626 can send or receive voice, video or data, and to communicate over the network 1626 using the instructions 1624. The instructions 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A viewing apparatus, comprising:
    a memory to store computer instructions; and
    a processor coupled to the memory, wherein the processor, responsive to executing the computer instructions, performs operations comprising:
        receiving first instructions to display first images during a first periodic time slot of a plurality of periodic time slots;
        receiving second instructions to display second images during a second periodic time slot of the plurality of periodic time slots;
        receiving first light signals at a first intensity and associated with the first images, wherein the viewing apparatus comprises a first optical element that allows the first light signals to penetrate the first optical element during the first periodic time slot to display the first images during the first periodic time slot;
        receiving second light signals of a second intensity and associated with the second images, wherein the viewing apparatus comprises a second optical element that allows the second light signals to penetrate the second optical element during the second periodic time slot to display the second images during the second periodic time slot;
        providing illumination information to adjust the first intensity of the first light signals and thereby produce updated first light signals having an updated intensity; and receiving the updated first light signals having the updated intensity while the second intensity of the second light signals remains unchanged.

2. The viewing apparatus of claim 1, wherein the operations further comprise:
receiving a synchronization signal; and
synchronizing to the first periodic time slot and to the second periodic time slot according to the synchronization signal.

3. The viewing apparatus of claim 1, wherein the operations further comprise:
receiving a synchronization signal; and
adjusting the first intensity of the first light signals at the viewing apparatus according to the synchronization signal.

4. The viewing apparatus of claim 1, wherein the operations further comprise:
receiving an audio signal; and
presenting audio content according to the audio signal.

5. The viewing apparatus of claim 1, wherein the first optical element comprises a first active shutter element, and wherein the second optical element comprises a second active shutter element.

6. The viewing apparatus of claim 1, wherein the first optical element has a first polarization configuration, and wherein the second optical element has a second polarization configuration.

7. The viewing apparatus of claim 1, further comprising a light sensor, wherein the operations further comprise:
capturing a signal from the light sensor; and
converting the signal to the illumination information.

8. The viewing apparatus of claim 7, wherein the signal comprises ambient light, light traversing the first optical element of the viewing apparatus, light traversing the second optical element of the viewing apparatus, the light emitted during the first periodic time slot, the light emitted during the second periodic time slot, or any combinations thereof.

9. The viewing apparatus of claim 1, wherein the illumination information is provided responsive to a manipulation of a user interface at the viewing apparatus.

10. A computer-readable storage device comprising computer instructions which, responsive to being executed by a processor of a viewing apparatus, cause the processor to perform operations comprising:
receiving first instructions to display first images during a first periodic time slot of a plurality of periodic time slots;
receiving second instructions to display second images during a second periodic time slot of the plurality of periodic time slots;
receiving first light signals at a first intensity and associated with the first images, wherein the viewing apparatus comprises a first optical element that allows the first light signals to penetrate the first optical element during the first periodic time slot to display the first images during the first periodic time slot;
receiving second light signals of a second intensity and associated with the second images, wherein the viewing apparatus comprises a second optical element that allows the second light signals to penetrate the second optical element during the second periodic time slot to display the second images during the second periodic time slot;
providing illumination information to adjust the first intensity of the first light signals and thereby produce updated first light signals having an updated first intensity; and
receiving the updated first light signals having the updated first intensity while the second intensity of the second light signals remains unchanged.

11. The computer-readable storage device of claim 10, wherein the operations further comprise:
receiving a synchronization signal; and
synchronizing to the first periodic time slot and to the second periodic time slot according to the synchronization signal.

12. The computer-readable storage device of claim 10, wherein the operations further comprise:
receiving an audio signal; and
presenting audio content according to the audio signal.

13. The computer-readable storage device of claim 10, wherein the first light signals comprises ambient light, light traversing the first optical element of the viewing apparatus, light traversing the second optical element of the viewing apparatus, the light emitted during the first periodic time slot, the light emitted during the first periodic time slot, or any combinations thereof.

14. The computer-readable storage device of claim 10, wherein the illumination information is provided responsive to a manipulation of a user interface at the viewing apparatus.

15. A media processor device, comprising:
a memory to store computer instructions; and
a controller coupled to the memory, wherein the controller, responsive to executing the computer instructions, performs operations comprising:
directing a viewing apparatus to display first images during a first periodic time slot of a plurality of periodic time slots;
directing the viewing apparatus to display second images during a second periodic time slot of the plurality of periodic time slots;
directing a presentation device to emit first light signals of a first intensity and associated with the first images, wherein the first light signals are received at the viewing apparatus and wherein the viewing apparatus comprises a first optical element that allows the first light signals to penetrate the first optical element during the first periodic time slot to display the first images during the first periodic time slot;
directing the presentation device to emit second light signals of a second intensity and associated with the second images, wherein the second light signals are received at the viewing apparatus and wherein the viewing apparatus comprises a second optical element that allows the second light signals to penetrate the second optical element during the second periodic time slot to display the second images during the second periodic time slot;
receiving illumination information from the viewing apparatus; and
directing the presentation device to adjust the first intensity of the first light signals according to the illumination information while not adjusting the second intensity of the second light signals.

16. The media processor device of claim 15, wherein the illumination information comprises a first signal captured at a first light sensor of the viewing apparatus.

17. The media processor device of claim 16, wherein the first signal comprises a ambient light, light traversing the first optical element of the viewing apparatus, light traversing the second optical element of the viewing apparatus, the light emitted by the presentation device during the first periodic time slot, the light emitted by the presentation device during the second periodic time slot, or any combinations thereof.

18. The media processor device of claim 15, wherein the illumination information is received responsive to a manipulation of a user interface at the viewing apparatus.

19. The media processor device of claim 15, wherein the first images and second images comprise video content or still image content, and wherein the media processor device comprises a set-top box, a gaming console, or a portable communication device.

20. The media processor device of claim 15, wherein the operations further comprise directing the presentation device to adjust the first intensity of the first light signals emitted by lighting elements of the presentation device during a portion of the first periodic time slot.

* * * * *